United States Patent
Hsieh et al.

(10) Patent No.: US 7,106,018 B2
(45) Date of Patent: Sep. 12, 2006

(54) METHOD OF BALANCING THE ROTATION OF A MOTOR

(75) Inventors: Ting-Chung Hsieh, Tainan (TW); Cheng-Te Chen, Kaohsiung (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 20 days.

(21) Appl. No.: 10/953,555

(22) Filed: Sep. 30, 2004

(65) Prior Publication Data

US 2005/0264249 A1 Dec. 1, 2005

(30) Foreign Application Priority Data

May 25, 2004 (TW) ............................... 93114774 A

(51) Int. Cl.
G05F 1/70 (2006.01)

(52) U.S. Cl. ...................... 318/438; 318/254; 318/138; 318/439; 318/727; 318/8.01

(58) Field of Classification Search ................ 318/438, 318/254, 439, 138, 727, 801, 799, 729
See application file for complete search history.

(56) References Cited

U.S. PATENT DOCUMENTS

| 3,997,825 | A | * | 12/1976 | Miyasita et al. | ............. 318/713 |
| 2002/0149342 | A1 | * | 10/2002 | Nakata et al. | ............. 318/801 |
| 2002/0190685 | A1 | * | 12/2002 | Sadasivam et al. | ......... 318/727 |

\* cited by examiner

Primary Examiner—Karen Masih

(57) ABSTRACT

A method of balancing the rotation of a motor is provided. Whether or not the motor is in a balanced rotation is determined by detecting whether the variation of a power-factor angle is less than or equal to a preset balance angle according to the principle that the load on a motor has an effect on the variation of the power-factor angle. The determined balance state of the motor is used to adjust the rotation speed of the motor.

20 Claims, 3 Drawing Sheets

METHOD OF BALANCING THE ROTATION OF A MOTOR

This Non-provisional application claims priority under 35 U.S.C. § 119(a) on Patent Application No(s). 093114774 filed in Taiwan on May 25, 2004, the entire contents of which are hereby incorporated by reference.

BACKGROUND OF THE INVENTION

1. Field of Invention

The invention is related to a method of rotation for a motor, and particularly to a method of balancing the rotation of a motor.

2. Related Art

Generally, a three-phase sense motor rotates by being driven by an alternating current (AC) motor driver. However, when the load of the motor is varied, the rotation of the motor is affected. For example, with the drying process in a washing machine, the clothes in the machine are a various load to a machine motor since the clothes change from a wet state to a half-dry state. When the various load is not distributed uniformly in a washing trough in the machine, an eccentricity is created that causes an imbalanced rotation of the motor. In this case, more drying is necessary, efficiency is worse and energy is inappropriately consumed. Therefore, detection and control of the motor rotation require attention and effort to improve this situation.

For motor detection, sensors are generally used to determine if the motor is in a balanced state in rotation. If it is not, the direction or speed of the motor rotation is controlled to achieve a balanced state. However, some sensors required in the detection are costly. To reduce cost, some motors are not equipped with the detection and control functions. Therefore, it is important to reduce the utilization of the expensive sensors in the motor, especially with the current trend of low-cost devices.

SUMMARY OF THE INVENTION

In view of the aforementioned problem and the disadvantages existing in the prior art, the invention provides a method of balancing the rotation of a motor, by which the rotation speed output of the motor is determined by detecting variation of a power-factor angle and comparing the power-factor angle to a preset balance angle.

To achieve the abovementioned objective, the method provided by the invention comprises the steps of: detecting an output current phase value and an output voltage phase value after the motor is rotated; obtaining a power-factor angle and determining whether a power factor angle sampling time is cut-off; computing an average of variation for the power-factor angle; determining whether the average of variation of the power-factor angle is less than or equal to a preset balance angle; increasing a rotation speed of the motor to a first preset speed when the variation average of the said power-factor angle is less than or equal to the preset power-factor angle; limiting the rotation speed of the motor to a second preset speed when the variation average of the power-factor angle is greater than the preset power-factor angle, wherein the first preset speed is greater than the second rotation speed.

By detecting the power-factor angle the rotation of the motor may be determined. When the motor is out of a balanced operation, the rotation speed is limited to a preset value to prevent the motor from rotating at high speed. When the motor rotates in a balanced operation, the motor is adjusted to a preset high speed in a minimum period. Therefore, the purpose of energy saving and efficiency promoting may be achieved.

The foregoing, as well as additional objects, features and advantages of the invention will be more readily apparent from the following detailed description, which proceeds with reference to the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

First, the relation between a power-factor angle θ and the corresponding motor rotation is explained below. For a three-phase sense motor rotation system, not limited to a three-phase sense motor, the three-phase current output values Iu, Iv and Iw and the three-phase voltage values Vu, Vv and Vw may be obtained by use of a current sensor of a motor driver. The relation between a power-factor angle θ and the corresponding motor rotation may be obtained by the following methods.

Method 1: let the output current Iu=Irms*sin(ωt−θ), the output current Iv=Irms*sin(ωt−2π/3−θ), the output current Iw=Irms*sin(ωt+2π/3−θ), the output voltage Vu=Vrms*sin(ωt), the output voltage Vv=Vrms*sin(ωt−2ω/3) and the output voltage Vw=Vrms*sin(ωt+2π/3), then cos(θ)=Sqrt(2/3)*(Iu*Vu+Iv*Vv+Iw*Vw) /(Vrms*Sqrt(Iu^2+Iv^2+Iw^2)).

Method 2: since the power provided to the three-phase load P=3*V*I*cos(θ), the power factor angle θ=cos⁻¹(P/(3*V*I)).

Method 3: the power-factor angle is the difference between the output current phase and the output voltage phase when the output current phase is zero; i.e., when the current enters into a zero crossing area.

According to the foregoing methods, when the three phases are not in a balanced state the power-factor angle presents a greater variation, which means that the motor is not in a balanced rotation state. On the other hand, in a system with a stable load and without oscillation, the power-factor angle is stable and smaller. By virtue of this characteristic, the current load variation may be known in order to determine whether the rotation speed of the motor needs to be adjusted. Therefore, in the invention the power-factor angle is first detected to determine the rotation state of the motor and then the rotation speed of the motor is adjusted.

Figure 1:
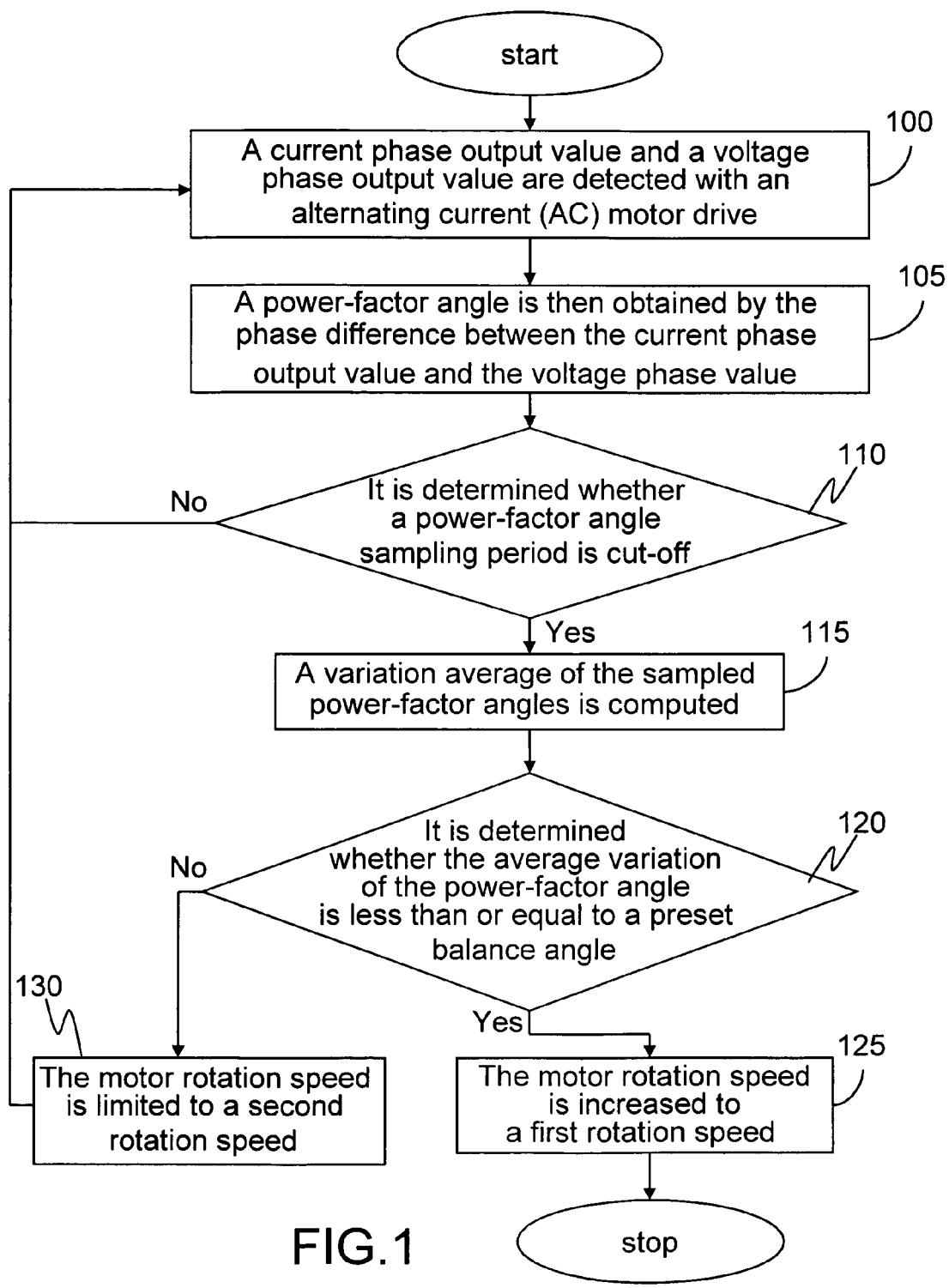
FIG. 1 is a flow chart according to an embodiment of the invention.

Refer to FIG. 1, which is a flow chart of an operation according to the invention. First, the parameters for setting a motor to rotate in a balanced state are initialized, such as balance angle, first rotation speed and second rotation speed. The first rotation speed is greater than the second rotation speed. When the three-phase sense motor rotates, a current phase output value and a voltage phase output value are detected with an alternating current (AC) motor driver (step 100). A power-factor angle is then obtained by the phase difference between the current phase output value and the voltage phase value (step 105). Next it is determined whether a power-factor angle sampling period is cut-off (step 110). A variation average of the sampled power-factor angles is computed according to the sampled power-factor angles and the sampling times when the power-factor angle sampling period is cut off (step 115). The process returns to step 100 if the power-factor angle sampling period is not cut-off.

Next, it is determined whether the average variation of the power-factor angle is less than or equal to a preset balance angle (step 120). The motor rotation speed is increased to a first rotation speed when the variation of the average of the power-factor-angle is determined to be less than or equal to the preset balance angle (step 125). The motor rotation speed is limited to a second rotation speed when the variation of the average of the power-factor-angle is determined to be greater than the preset balance angle (step 130). The process then returns to step 100, avoiding high rotation speed of the motor by limiting the motor rotation speed to the second rotation speed when the motor is in an imbalanced state. This method saves energy and promotes efficiency.

Figure 2:
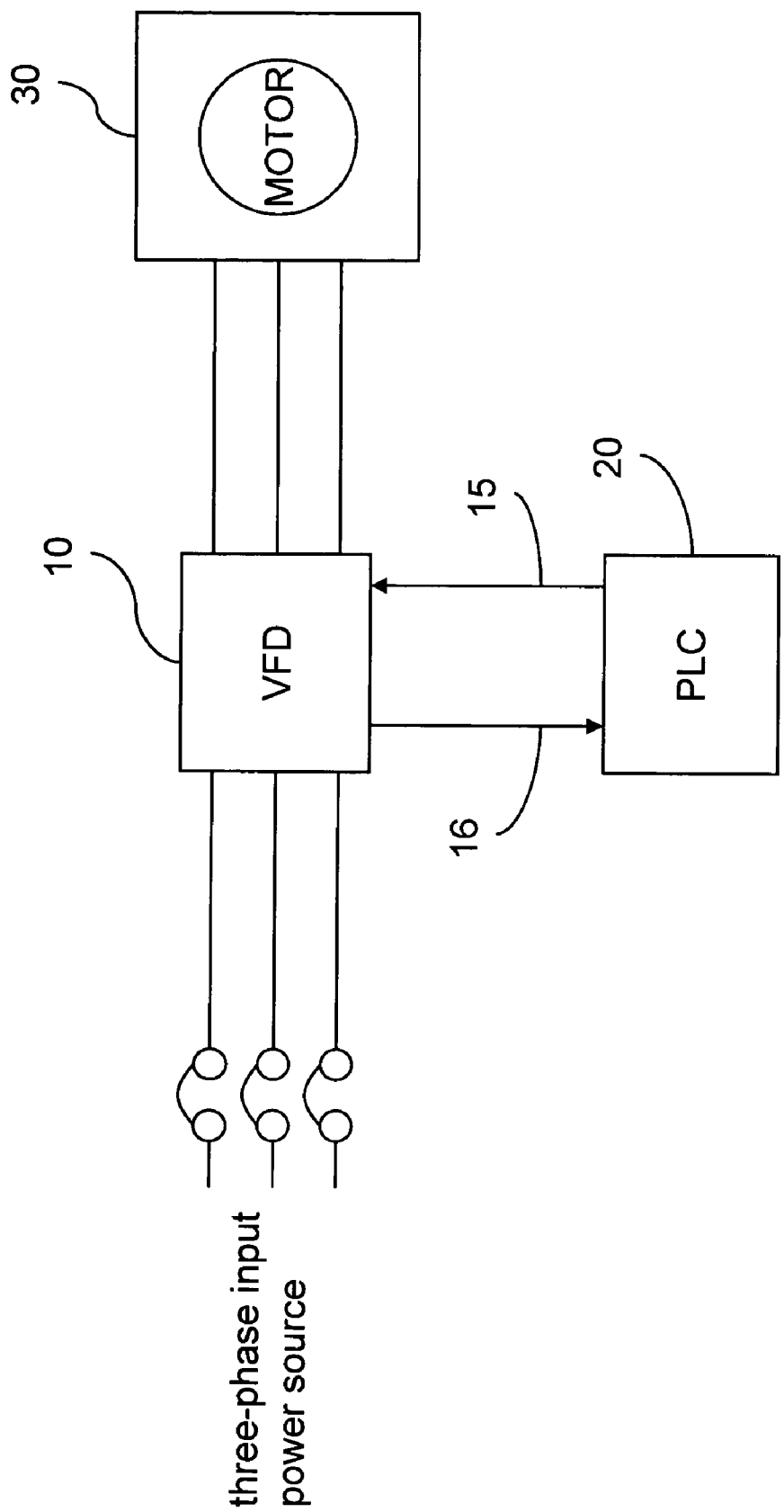
FIG. 2 is a system block according to an embodiment of the invention.

Refer to FIG. 2, which is described here by example of a washing machine rotation system. When a three-phase input power source is powered on, a programmable logic controller (PLC) 20 initializes an out-of-balance (OOB) control operation via a multi-function input (MFI) 15 of a variable frequency driver (VFD) 10. That is, the output of the VFD 10 is limited to a second rotation frequency to maintain the rotation at a preset rotation speed. As such, the motor 30 is prevented from rotating at high speed in an imbalanced state.

When the variation of the to-be-sampled power-factor angle is less than or equal to the preset balance angle, the motor 30 is operating in a balanced state. The VFD 10 informs the PLC 20 via a multi-function output (MFO) 16 that the rotor system has reached a balanced state and the PLC 20 terminates the OOB operation. Then, the VFD 10 outputs a first frequency and the motor 30 increases to a first rotation speed according to the input driving frequency.

Figure 3:
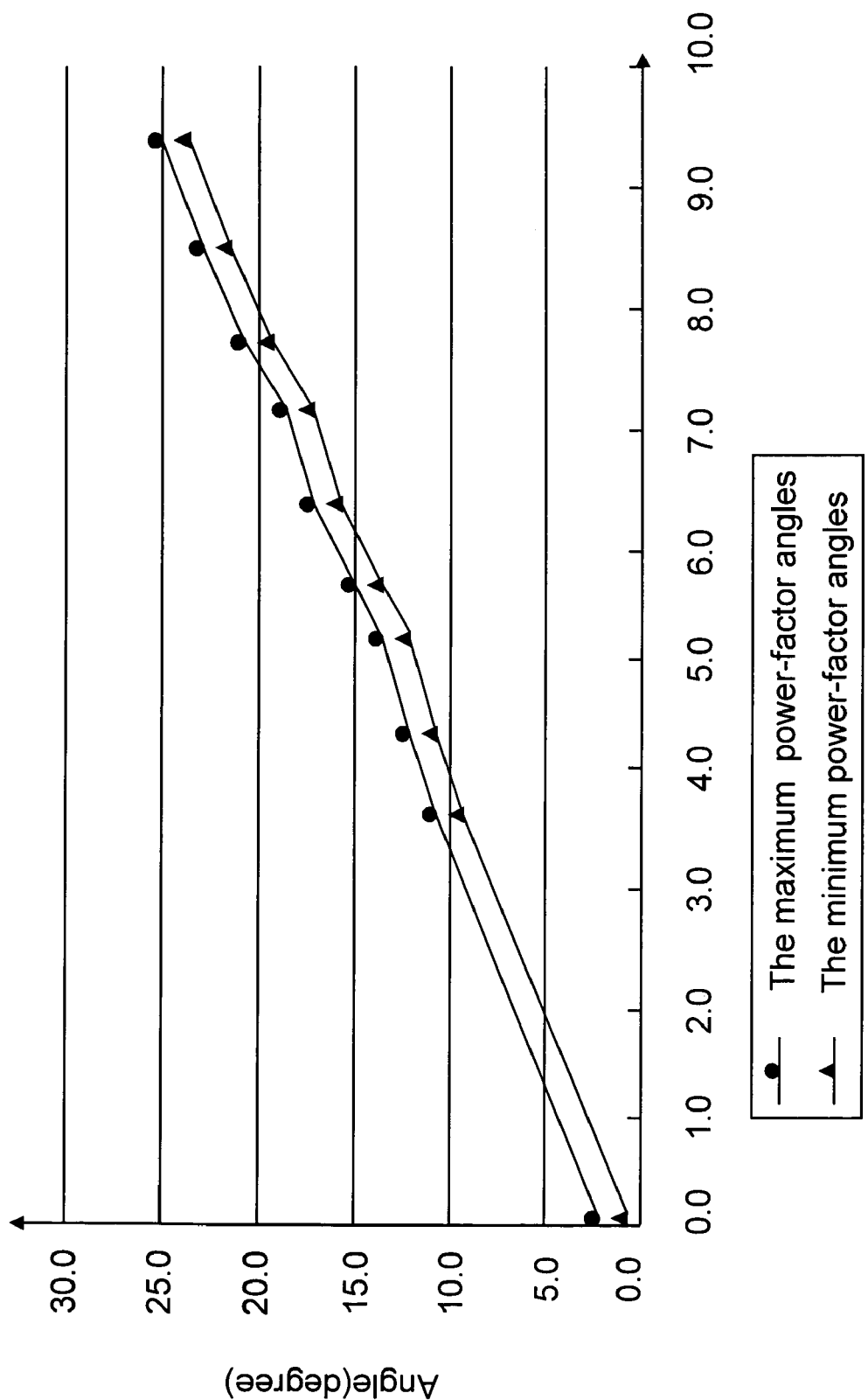
FIG. 3 is a characteristic curve according to an embodiment curve of the invention.

Refer to FIG. 3, which shows a characteristic curve according to an embodiment curve of the invention. While obtaining the characteristic curve, the power-factor angle is obtained by a sampling operation, e.g., one time every 3 seconds. In each of the sampling periods, the maximum and the minimum power-factor values are recorded. When the sampling period is over, the difference between the maximum and the minimum power-factor angles is computed as the angle variation of this sampling period. The same sampling and computing operation is repeated for each sampling period in the sampling operation. Next, an averaging operation is performed upon all sampling operations to obtain an average of the variation of all power-factor angles and reduce errors in the single sampling operation.

FIG. 3 shows the load and the power-factor angle are in a linear relation to one another, meaning that although a different load has a different power-factor angle, the variation of the power-factor angle is constant. Due to this characteristic, whether or not the motor is balanced may be determined by detecting the variation of the power-factor angle. When variation is detected, the current load of the motor is changed. Therefore, a balance angle is set ("preset" in this specification) by the relation between the motor rotation speed and the corresponding load. The balance angle is considered as a reference if the motor is in a balanced state. Further, the conditions for determining the power-factor angle and setting the balance angle are used to adjust the rotation speed of the motor. Therefore, a corresponding load is known from the power-factor angle via the characteristic curve. The motor outputs a corresponding torque to balance off an imbalance state due to load variation.

A washing machine is taken as example for description of FIG. 3. When the washing machine is in a drying process the motor in the machine is rotating. The load of the motor is 6 Kgs when the clothes in the washing machine are fully wet. The balance angle is set at 19 degrees and the power-factor angle detected is 17 degrees. The power-factor angle is greater than the balance angle meaning the motor is in an imbalanced state. The motor is limited to a preset second rotation speed for slow rotation and the output torque is 6 kgs. When the clothes become dryer, the detected power-factor angle is 15 degrees and the corresponding load is 5 kgs. When the power-factor angle is still greater than the balance angle, the motor is also in an imbalanced state.

Therefore, the motor is limited to the preset second rotation speed and outputs a torque of 5 kgs. When the clothes are in a half-dry state, the power-factor is detected as 10 degrees and the corresponding load is 3.8 kg. Since the power-factor angle is equal to the preset balance angle, the motor is in a balanced state. At that time, the rotation speed of the motor is increased to a preset first rotation speed with an output torque of 3.8 kgs, and a high-speed drying process is launched.

Since the motor outputs a corresponding torque to balance off the imbalanced state of the motor rotation and the rotation speed is inversely proportionate to the torque, the motor outputs a lower torque when the rotation speed is higher while outputting a higher torque when the rotation speed is lower. Besides, the detection of the power-factor angle may have a smaller error by using the average value of the sampled power-factor angle.

By detecting the power-factor angle, the motor rotation state may be determined. Along with some external control devices, e.g., PLC, micro control unit (MCU) and digit input, the rotation speed of the motor may be limited to a preset rotation speed when the motor is in an imbalanced state. On the other hand, the rotation speed of the motor may be increased to a preset high speed in a minimum period when the motor is determined to be in a balanced state. As such, the purposes of energy saving and improved rotation efficiency are achieved.

While the preferred embodiments of the invention have been described as the above, they are not deemed a limitation in the scope of the invention. Further, all modifications and variations deduced from the embodiments of the invention are to be considered within the scope of the invention.

What is claimed is:

1. A method of balancing a rotation of a motor comprising the steps of:
   providing a balance angle according to a relation between a motor and a load;
   detecting an output phase value and an output voltage phase value of said motor;
   obtaining a power-factor angle according to said output phase value of said motor and said output voltage phase value; and
   determining a difference between a variation of said power-factor angle and said balance angle to adjust a rotation speed of said motor;

wherein said variation of said power-factor angle is determined by a difference between maximum power-factor angle and a minimum power-factor angle in a sampling period.

2. The method according to claim 1, wherein said motor is an alternating current (AC) sense motor.

3. The method according to claim 2, wherein said motor is a three phase sense motor.

4. The method according to claim 2, wherein said motor is a single phase sense motor.

5. The method according to claim 1, wherein said rotation speed of said motor is increased to a first rotation speed when said variation of said power-factor angle is less than or equal to said balance angle.

6. The method according to claim 5, wherein said rotation speed of said motor is limited to a second rotation speed when said first rotation speed is greater than said second rotation speed.

7. The method according to claim 1, wherein said rotation speed of said motor is adjusted by a programmable logic controller (PLC).

8. The method according to claim 1, wherein said rotation speed of said motor is adjusted by a microprocessor control unit (MCU).

9. The method according to claim 1, wherein said rotation speed of said motor is adjusted by a digit input.

10. The method according to claim 1, wherein said power-factor angle is obtained by a relation said power-factor angle is equal to $\cos^{-1}$ a phase difference between said output current and said output voltage.

11. A method of balancing a rotation of a motor comprising the steps of:
    providing a balance angle according to a relation between a motor and a load;
    detecting an output phase value and an output voltage phase value of said motor;
    obtaining a power-factor angle according to said output phase value of said motor and said output voltage phase value; and
    determining a difference between a variation of said power-factor angle and said balance angle to adjust a rotation speed of said motor;
    wherein said rotation speed of said motor is increased to a first rotation speed when said variation of said power-factor angle is less than or equal to said balance angle.

12. The method according to claim 11, wherein said motor is an alternating current (AC) sense motor.

13. The method according to claim 12, wherein said motor is a three phase sense motor.

14. The method according to claim 12, wherein said motor is a single phase sense motor.

15. The method according to claim 11, wherein said variation of said power-factor angle is determined by a difference between maximum power-factor angle and a minimum power-factor angle in a sampling period.

16. The method according to claim 11, wherein said rotation speed of said motor is limited to a second rotation speed when said first rotation speed is greater than said second rotation speed.

17. The method according to claim 11, wherein said rotation speed of said motor is adjusted by a programmable logic controller (PLC).

18. The method according to claim 11, wherein said rotation speed of said motor is adjusted by a microprocessor control unit (MCU).

19. The method according to claim 11, wherein said rotation speed of said motor is adjusted by a digit input.

20. The method according to claim 11, wherein said power-factor angle is obtained by a relation said power-factor angle is equal to $\cos^{-1}$ a phase difference between said output current and said output voltage.

* * * * *